（12）United States Patent
Oh et al.

(10) Patent No.: US 10,007,139 B2
(45) Date of Patent: Jun. 26, 2018

(54) LIQUID CRYSTAL DISPLAY MODULE AND LIQUID CRYSTAL DISPLAY COMPRISING THE SAME

(71) Applicant: Samsung SDI Co., Ltd., Yongin-si, Gyeonggi-do (KR)

(72) Inventors: Young Oh, Uiwang-si (KR); Seong Hoon Lee, Uiwang-si (KR); Jeong Ho Lee, Uiwang-si (KR); Young Hyun Ju, Uiwang-si (KR); Sang Cheon Park, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days. days.

(21) Appl. No.: 14/983,040

(22) Filed: Dec. 29, 2015

(65) Prior Publication Data
US 2016/0187682 A1 Jun. 30, 2016

(30) Foreign Application Priority Data

Dec. 31, 2014 (KR) .................. 10-2014-0196078
Dec. 31, 2014 (KR) .................. 10-2014-0196079
Nov. 3, 2015 (KR) .................. 10-2015-0154143

(51) Int. Cl.
*G02F 1/1335* (2006.01)
*G02B 5/04* (2006.01)
*G02B 5/02* (2006.01)

(52) U.S. Cl.
CPC ..... *G02F 1/133504* (2013.01); *G02B 5/0231* (2013.01); *G02B 5/0278* (2013.01); *G02B 5/045* (2013.01); *G02F 1/133528* (2013.01)

(58) Field of Classification Search
CPC ... G02F 1/133504; G02F 2001/133507; G02F 1/133528; G02F 2001/133562; G02B 5/045; G02B 5/0231; G02B 5/0278
See application file for complete search history.

(56) References Cited

U.S. PATENT DOCUMENTS

2008/0260336 A1* 10/2008 Hwang ............... G02B 6/0053
385/120
2011/0051046 A1 3/2011 Kim et al.
2012/0176572 A1* 7/2012 Park ..................... G02B 3/005
349/112

FOREIGN PATENT DOCUMENTS

JP 2003-075605 A 3/2003
JP 2005-345990 A 12/2005
(Continued)

OTHER PUBLICATIONS

KIPO Office action dated Dec. 7, 2015, issued in KR Application No. 10-2015-0154142, 9 pages.
(Continued)

*Primary Examiner* — Nathanael R Briggs
(74) *Attorney, Agent, or Firm* — Lewis Roca Rothgerber Christie LLP

(57) ABSTRACT

A liquid crystal display module includes first and second polarizing plates, and a liquid crystal panel between the polarizing plates. The second polarizing plate comprises an optical film on a polarizer. The optical film comprises a high refractive index pattern layer having at least one engraved pattern, and a low refractive index pattern layer having a filling pattern that fills at least a portion of the engraved pattern. The high refractive index pattern layer has a higher refractive index than the low refractive index pattern layer. The optical film is disposed such that light emitted from the liquid crystal panel will enter the low refractive index pattern layer and then be emitted through the high refractive index pattern layer. A liquid crystal display includes the liquid crystal display module.

15 Claims, 8 Drawing Sheets

(56) References Cited

FOREIGN PATENT DOCUMENTS

| | | |
|---|---|---|
| JP | 2006-251352 A | 9/2006 |
| JP | 2009-205150 A | 9/2009 |
| JP | 2011-150945 A | 8/2011 |
| JP | 2012-204192 A | 10/2012 |
| JP | 2012-209206 A | 10/2012 |
| JP | 2014-182280 A | 9/2014 |
| KR | 10-2004-0061229 A | 7/2004 |
| KR | 10-2008-0113154 A | 12/2008 |
| KR | 10-2010-0033663 A | 3/2010 |
| KR | 10-2011-0023054 A | 3/2011 |
| KR | 10-2014-0074763 A | 6/2014 |
| WO | WO 2008-072599 A1 | 6/2008 |

OTHER PUBLICATIONS

KIPO Office action dated Dec. 7, 2015. Issued in KR Application No. 10-2015-0154143, 7 pages.
Japan Office action dated Jan. 4, 2017, corresponding to Japanese Patent Application No. 2015-257678 (8 pages).

* cited by examiner

LIQUID CRYSTAL DISPLAY MODULE AND LIQUID CRYSTAL DISPLAY COMPRISING THE SAME

CROSS-REFERENCE TO RELATED APPLICATIONS

This application claims priority to and the benefit of Korean Patent Application Nos. 10-2014-0196078 filed on Dec. 31, 2014, 10-2014-0196079 filed on Dec. 31, 2014, and 10-2015-0154143 filed on Nov. 3, 2015, all of which were filed in the Korean Intellectual Property Office (KIPO), and the entire contents of both of which are incorporated herein by reference.

BACKGROUND

1. Technical Field

Embodiments of the present invention relate to a liquid crystal display module and a liquid crystal display including the same.

2. Description of the Related Art

Liquid crystal displays emit light through a liquid crystal panel after receiving the light from a backlight unit. Thus, liquid crystal displays may provide good color quality at a front side thereof. However, liquid crystal displays exhibit deteriorated color quality, contrast ratio and brightness uniformity at the side surfaces thereof as compared to the front surface thereof. Various attempts have been made to develop an improved liquid crystal panel or liquid crystal structure having improved color quality and contrast ratio at the side surfaces of the liquid crystal display.

With increasing screen sizes of liquid crystal displays, the visible region of the liquid crystal display is significantly enlarged not only at the front side thereof, but also at the left and right sides thereof. This causes a significant deterioration in the contrast ratio at the lateral sides of the display as compared to the contrast ratio at the front side of the display. Moreover, liquid crystal displays experience increased deteriorations in brightness uniformity with increasing screen sizes of the liquid crystal display. As a result, a separate liquid crystal display module must be provided depending upon the screen size, thereby deteriorating processability and economic feasibility.

SUMMARY

In accordance with embodiments of the present invention, a liquid crystal display module may include a liquid crystal display module including a first polarizing plate, a second polarizing plate, and a liquid crystal panel disposed between the first polarizing plate and the second polarizing plate. The second polarizing plate includes a polarizer and an optical film formed on the polarizer. The optical film includes a high refractive index pattern layer having at least one engraved pattern, and a low refractive index pattern layer having a filling pattern that fills at least portion of the engraved pattern. The high refractive index pattern layer has a higher refractive index than the low refractive index pattern layer. The optical film is disposed such that light emitted from the liquid crystal panel enters the low refractive index pattern layer and is then emitted through the high refractive index pattern layer.

In accordance with embodiments of the present invention, a liquid crystal display may include the liquid crystal display module as set forth herein.

DETAILED DESCRIPTION

Figure 1:
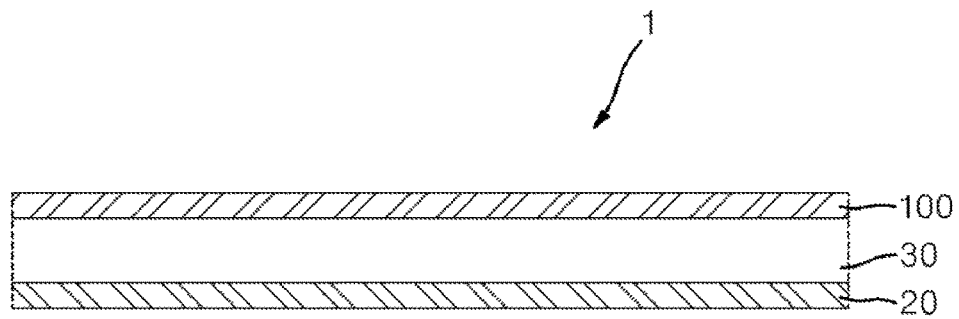
FIG. 1 is a schematic cross-sectional view of a liquid crystal display module according to embodiments of the present invention.

Embodiments of the present invention are described with reference to the accompanying drawings to provide a thorough understanding of the embodiments of the invention to those skilled in the art. It should be understood that the described embodiments of the present invention may be modified in different ways and the present invention is not limited to the following embodiments. In the drawings, portions irrelevant to the description are omitted for clarity. Like components are denoted by like reference numerals throughout the specification.

As used herein, spatially relative terms such as "upper" and "lower" are defined with reference to the accompanying drawings. Thus, it is understood that "upper" can be used interchangeably with "lower". It is understood that when a layer is referred to as being "on" another layer, it can be directly formed on the other layer, or intervening layer(s) may also be present. Thus, it is understood that when a layer is referred to as being "directly on" another layer, no intervening layer is formed therebetween.

As used herein, the terms "horizontal direction" and "vertical direction" mean a longitudinal direction and a transverse direction, respectively, of a rectangular screen of a liquid crystal display.

As used herein, the term "side surface" means a region in which θ ranges from 60° to 90° in a spherical coordinate system (φ, θ) in which a front surface is indicated by (0°,0°), a left end point is indicated by (180°,90°), and a right end point is indicated by (0°, 90°) with reference to the horizontal direction.

Figure 12:
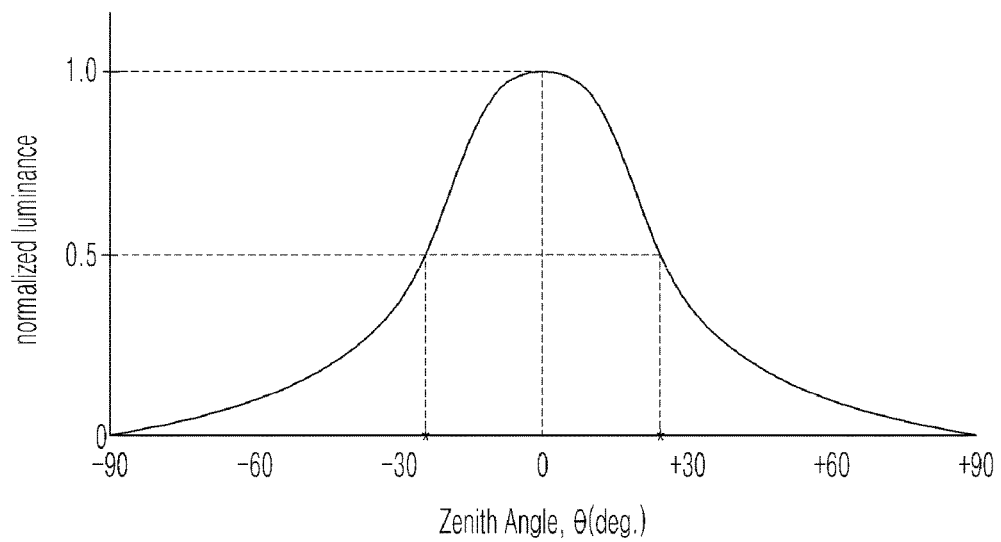
FIG. 12 is a graph depicting the exit angle concept.

As used herein, the term "exit angle" means an angle of the point of a liquid crystal display at which brightness becomes half the brightness in front of the liquid crystal display, as obtained by normalization of brightness values at each of the points indicated by −90° to +90°, when a front side of the liquid crystal display fabricated by assembling a light source, a light guide plate and a liquid crystal display module is indicated by 0°, the left side thereof is indicated by a negative (−) direction, the right side thereof is indicated by a positive (+) direction, a left end point thereof is indicated by −90°, and a right end point thereof is indicated by +90° with reference to the horizontal direction in FIG. 12. In FIG. 12, values indicated by * are the exit angles.

As used herein, the term "aspect ratio" refers to the ratio of the maximum height of an optical structure to the maximum pitch of the optical structure (maximum height/maximum pitch).

As used herein, the term "cycle" means the sum of the pitch of one engraved pattern and the pitch of one flat portion in an optical film.

As used herein, "in-plane retardation (Re)" is represented by Equation A and "out-of-plane retardation (Rth)" is represented by Equation B:

$$Re=(nx-ny)\times d \quad \text{Equation A}$$

$$Rth=((nx+ny)/2-nz)\times d \quad \text{Equation B}$$

In Equations A and B, nx, ny, and nz are the refractive indices at a wavelength of 550 nm in the slow axis direction (x-axis direction), the fast axis direction (y-axis direction) and the thickness direction (z-axis direction), respectively, of the corresponding optical device, and d is the thickness of the corresponding optical device in nm.

Figure 13:
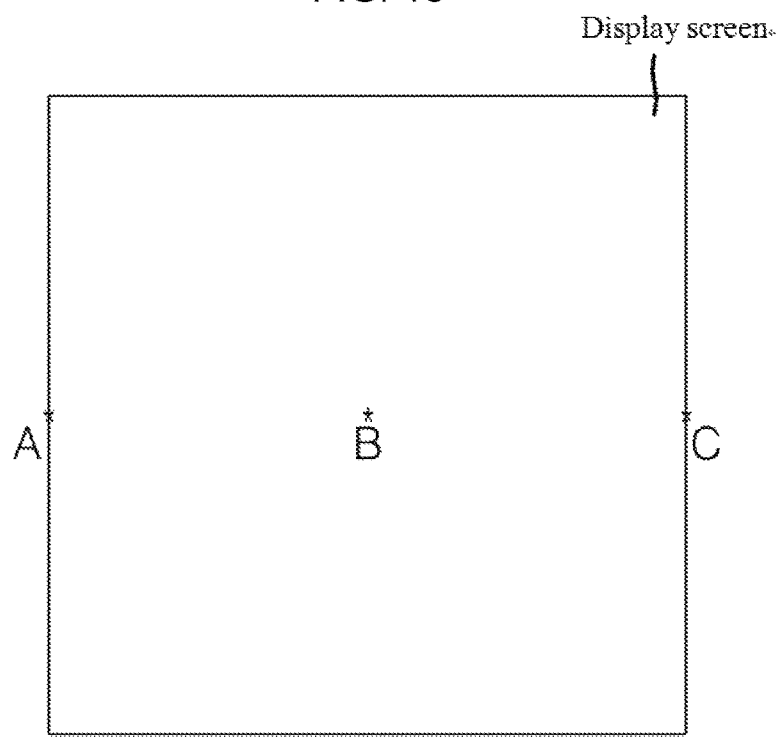
FIG. 13 is a diagram of a display screen for measuring brightness uniformity.

As used herein, "brightness uniformity" is a value calculated by {(Brightness min)/(Brightness max)}×100. Here, referring to FIG. 13, in a liquid crystal display fabricated by assembling a light source, a light guide plate, and a liquid crystal display module, brightness is measured at each of points A, B and C, where the central point, the left end point and the right end point of the display screen are indicated by B, A and C, respectively, and the maximum brightness value (Brightness max) and the minimum brightness value (Brightness min) are obtained. In measuring brightness, a brightness tester (e.g., EZ CONTRAST X88RC (EZXL-176R-F422A4, ELDIM Co., Ltd.)) is secured to the point B, and is then directed to face each of the points A, B and C. In FIGS. 13, A, B and C are placed on the same line.

As used herein, the term "(meth)acryl" refers to acryl and/or methacryl.

As used herein, the term "top portion" refers to a portion located at an uppermost portion with respect to a lowermost portion of a certain structure.

Figure 2:
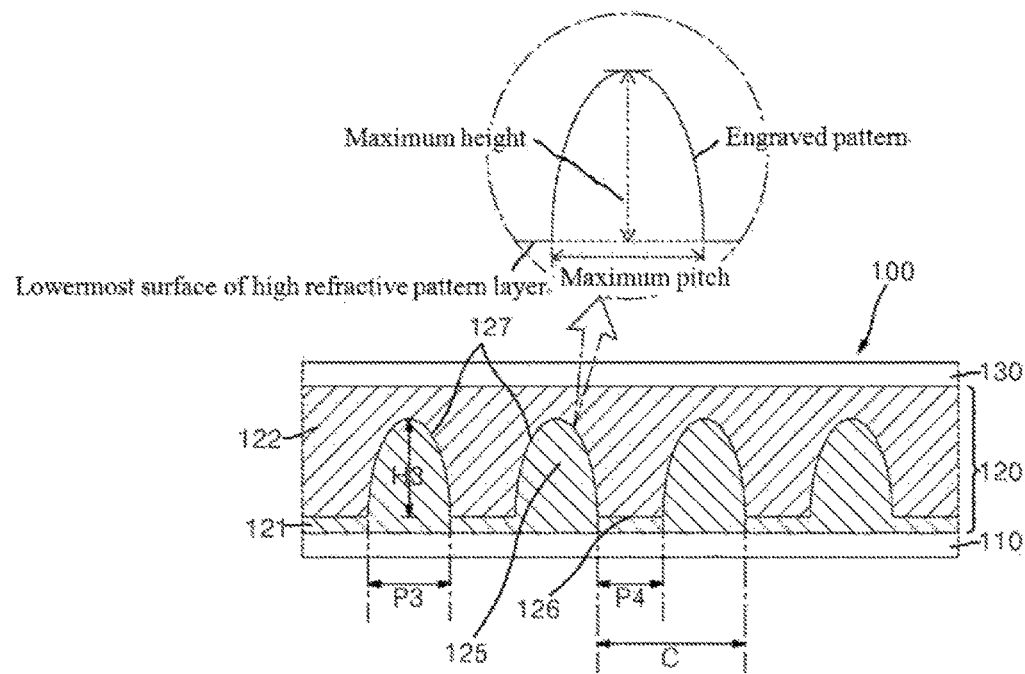
FIG. 2 is a schematic cross-sectional view of a second polarizing plate of the liquid crystal display module shown in FIG. 1.
Figure 3:
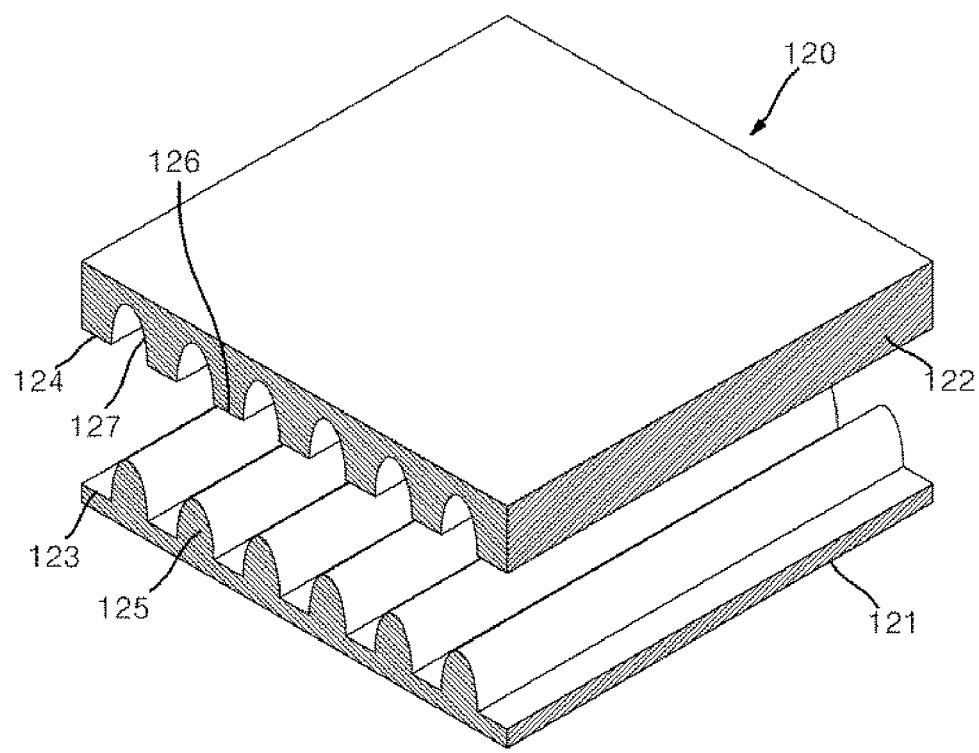
FIG. 3 is a partially exploded out perspective view of an optical film of the liquid crystal display module shown in FIG. 2.

Hereinafter, a liquid crystal display module according to embodiments of the present invention will be described with reference to FIG. 1 to FIG. 3. FIG. 1 is a schematic cross-sectional view of a liquid crystal display module according to embodiments of the present invention, FIG. 2 is a cross-sectional view of the second polarizing plate of the liquid crystal display module shown in FIG. 1, and FIG. 3 is a partially exploded perspective view of the optical film of the liquid crystal display module shown in FIG. 2.

Referring to FIG. 1, the liquid crystal display module 1 may include a first polarizing plate 20, a liquid crystal panel 30, and a second polarizing plate 100.

The first polarizing plate 20 may be disposed on a lower surface of the liquid crystal panel 30 and can polarize light entering the first polarizing plate 20. The first polarizing plate 20 may include a first polarizer and a first protective layer.

The first polarizer may polarize the light entering the first polarizing plate, and may include any suitable polarizer, such as those known to those of ordinary skill in the art. For example, the first polarizer may include a polyvinyl alcohol polarizer obtained by stretching a polyvinyl alcohol film in a uniaxial direction, or a polyene polarizer obtained by dehydration of a polyvinyl alcohol film.

The first protective layer may be formed on the first polarizer to protect the first polarizer. The first protective layer may be an isotropic optical film. As used herein, the term "isotropic optical film" may mean a film in which nx, ny and nz are substantially the same, and the expression "substantially the same" may mean either that these values are completely the same, or that there is a slight difference therebetween. The first protective layer may have an Re of about 5 nm or lower, for example about 0.1 nm to about 5 nm, at a wavelength of 550 nm. The first protective layer may have an Rth of about 5 nm or lower, for example about 0.1 nm to about 5 nm, at a wavelength of 550 nm. Within these ranges of Re and Rth, the first polarizing plate can achieve increased contrast ratio both in the vertical direction and in the gradient direction.

Although not shown in FIG. 1, the first polarizing plate 20 may be attached to the liquid crystal panel 30 via an adhesive layer or a bonding layer. The adhesive layer or the bonding layer may be formed of a composition that includes an adhesive resin and, optionally, a crosslinking agent, a silane coupling agent, a photo-radical initiator, or a photo-cationic initiator. The adhesive layer or the bonding layer may further include a light diffusing agent to promote diffusion of light. The light diffusing agent may include any suitable light diffusing agent, such as those known to those of ordinary skill in the art.

The liquid crystal panel 30 may be disposed between the first polarizing plate 20 and the second polarizing plate 100 and may be configured to allow light received from the first polarizing plate 20 to be transmitted therethrough to the second polarizing plate 100. The liquid crystal panel 30 may include a first substrate, a second substrate, and a liquid crystal layer acting as a display medium between the first substrate and the second substrate. The first substrate may include a color filter and a black matrix mounted thereon. The second substrate may include a switching device configured to control electro-optical characteristics of liquid crystals, an injection line configured to supply gate signal to the switching device, and a signal line to provide a source signal, a pixel electrode, and a counter electrode. The liquid crystal layer may include liquid crystals evenly aligned upon application of no electric field. For example, the liquid crystal panel 30 may adopt a vertical alignment (VA) mode, a patterned vertical alignment (PVA) mode, or a super-patterned vertical alignment (S-PVA) mode.

The second polarizing plate 100 may be disposed on an upper surface of the liquid crystal panel 30 and may be configured to polarize and diffuse light received from the liquid crystal panel 30. With this structure, the second polarizing plate 100 can achieve various improved properties including contrast ratio, brightness uniformity and viewing angle at the side surfaces of the liquid crystal display, while also exhibiting minimized variations in brightness uniformity depending upon the screen size of the liquid crystal display. The second polarizing plate 100 may include a second polarizer, an optical film, and a second protective layer.

Next, the second polarizing plate 100 is described with reference to FIG. 2 and FIG. 3. Referring to FIG. 2 and FIG. 3, the second polarizing plate 100 may include a second polarizer 110, an optical film 120, and a second protective layer 130.

The second polarizer 110 may be formed on the liquid crystal panel 30 and may polarize light received from the liquid crystal panel 30. The second polarizer 100 may include the same or a different kind of polarizer than the first polarizer.

The optical film 120 may be directly formed on the second polarizer 110 and may diffuse the polarized light received from the second polarizer 110. Here, the optical film 120 may directly contact the second protective layer 130. With this structure, the second polarizing plate can achieve various improved properties including contrast ratio, brightness uniformity and viewing angle at the side surfaces, while also exhibiting minimized variations in brightness uniformity depending upon the screen size of the liquid crystal display.

The optical film 120 may include a low refractive index pattern layer 121 and a high refractive index pattern layer 122. The optical film 120 may be positioned in the liquid crystal display module 1 such that light emitted from the liquid crystal panel 30 may enter the low refractive index pattern layer 121 and may then be emitted through the high refractive index pattern layer 122. With this structure, the optical film can provide substantial improvements in contrast ratio and viewing angle at the side surfaces of the liquid crystal display by improving the light diffusion effect.

Next, the optical film 120 is described with reference to FIG. 2 and FIG. 3. Referring to FIG. 2 and FIG. 3, the optical film 120 may include the high refractive index pattern layer 122 including at least one engraved pattern 127, and the low refractive index pattern layer 121 including a filling pattern 125 that fills at least a portion of the engraved pattern 127.

The high refractive index pattern layer 122 may have a first plane 124, which may include one or more engraved patterns 127 and one or more flat portions 126. Although the optical film is shown in FIG. 2 and FIG. 3 as including the engraved patterns 127 and the flat portions 126 alternately arranged (i.e., one by one) thereon, the formation sequence of the engraved patterns 127 and the flat portions 126 is not limited thereto. Referring to FIG. 2 and FIG. 3, a lenticular lens pattern including a curved surface is illustrated as the engraved pattern 127. However, it should be understood that the present invention is not limited thereto. The curved surface may act as a lens to diffuse the polarized light received from the second polarizer 110 by refracting the light in various directions depending upon the light incidence location thereon. The curved surface may include a spherical surface, a parabolic surface, an oval surface, a hyperbolic surface or an amorphous curved surface. The engraved pattern 127 may be a prism pattern having a triangular to decagonal cross-section and a curved surface at a top portion thereof. Further, although the curved surface is illustrated in FIG. 2 and FIG. 3 as having a smooth surface with no roughness, the curved surface may further include roughness to improve the light diffusion effect. The engraved pattern 127 may have an aspect ratio (H3/P3) of about 1.0 or lower, for example about 0.4 to about 1.0, or about 0.7 to about 1.0. Referring to FIG. 2, the aspect ratio refers to the ratio of the maximum height to the maximum pitch of the engraved pattern. A ratio (B/A) of the sum (B) of the maximum pitches (P3) of the engraved patterns 127 to the total width (A) of the high refractive index pattern layer 122 may be about 40% to about 60%, for example about 45% to about 55%. Within these ranges of the aspect ratio and the width ratio, the liquid crystal display can achieve various improved properties including contrast ratio, brightness uniformity and viewing angle at the side surfaces, while also exhibiting minimized variations in brightness uniformity depending upon screen size.

Referring to FIG. 2 again, the engraved pattern 127 may have a pitch (P3) of about 30 μm or less, for example about 5 μm to about 20 μm. The engraved pattern 127 may have a maximum height (H3) of about 20 μm or less, for example about 15 μm or less, about 5 μm to about 15 μm, or about 5 μm to about 10 μm. Within these ranges of the pitch and height, the engraved pattern can provide the light diffusion effect.

The flat portion 126 may be disposed between the engraved patterns 127 to diffuse light through total reflection of the light by the engraved pattern 127 when the light reaches the flat portion 126. A pitch (P4) of the flat portion 126 may be greater than or the same as the maximum pitch (P3) of the engraved pattern 127 (P4≥P3). A ratio (P3/P4) of the maximum pitch (P3) of the engraved pattern 127 to the pitch (P4) of the flat portion 126 may be about 1 or less. A ratio (P3/C) of the maximum pitch (P3) of the engraved pattern 127 to cycle (C) may be about 0.5 or less. Within these ranges, the high refractive index pattern layer 122 can achieve improved collection and diffusion of light. When light reaches the low refractive index pattern layer 121 and is not reflected towards the filling pattern 125 by the flat portion 126, the high refractive index pattern layer 122 may diffuse the light, thereby improving the light diffusion effect. Furthermore, the engraved patterns 127 may be arranged in a specified cycle, thereby further improving the light diffusion effect.

The high refractive index pattern layer 122 may have a refractive index of about 1.50 or greater, for example about 1.50 to about 1.60. Within these ranges, the high refractive index pattern layer 122 can provide good light diffusion effect. The high refractive index pattern layer 122 may be formed of a UV curable composition including at least one of a (meth)acrylic, a polycarbonate, a silicone, and/or an epoxy resin, but the high refractive index pattern layer 122 is not limited thereto.

The low refractive index pattern layer 121 may be formed on the second polarizer 110 and may diffuse the polarized light by refracting the light in various directions depending upon location of incidence of the light upon receiving the light in one direction from the second polarizer 110.

The low refractive index pattern layer 121 may be formed of a material having a lower refractive index than the high refractive index pattern layer 122, and may have a refractive index of lower than about 1.50, for example about 1.35 to lower than about 1.50. Within these ranges, the low refractive index pattern layer 121 can provide good light diffusion effect and can be easily formed. The low refractive index pattern layer 121 may be formed of a composition including a UV curable transparent resin. For example, the resin may include at least one of a (meth)acrylic, a polycarbonate, a silicone, and/or an epoxy resin, but the resin is not limited thereto. The composition may further include any suitable initiator for formation of the pattern layer.

The low refractive index pattern layer 121 may include a second plane 123 facing the first plane 124 of the high refractive index pattern layer 122 and may include at least one filling pattern 125. The filling pattern 125 may fill at least a portion of the at least one engraved pattern 127 of the high refractive index pattern layer 122. As used herein, the expression "fill at least a portion" refers to both a structure in which the filling pattern completely fills the engraved pattern 127, and a structure in which the filling pattern partially fills the engraved pattern 127. In the structure in which the filling pattern partially fills the engraved pattern, the remaining portion of the engraved pattern may be filled with air or a resin having a specified refractive index. For example, the resin may have a refractive index which is the same as or higher than that of the low refractive index pattern layer, and is the same as or lower than that of the high refractive index pattern layer 122. Although FIG. 3 depicts an optical film in which the filling pattern 125 and the engraved pattern 127 extend in a stripe shape, the filling pattern 125 and the engraved pattern 127 may be formed in any suitable shape, such as, for example, a dot shape. As used herein, the term "dot" refers to a shape in which combinations of the filling patterns and the engraved patterns are dispersed.

A difference in refractive index between the high refractive index pattern layer 122 and the low refractive index pattern layer 121 may be about 0.20 or less, for example about 0.10 to about 0.20, or about 0.10 to about 0.15. Within these ranges, the optical film can achieve light collection and diffusion effects.

Although not shown in FIG. 2 and FIG. 3, at least one of the high refractive index pattern layer and the low refractive index pattern layer may include a light diffusing agent. As a result, the liquid crystal display can achieve improvements in both the viewing angle of the longitudinal direction corresponding to the horizontal direction of the display screen, and in the viewing angle of the transverse direction corresponding to the vertical direction of the display screen. In addition, when the height of the engraved pattern is further reduced as compared with the height of the high refractive index pattern layer not including the light diffusing agent, it is possible to provide significant improvement in viewing angle.

The light diffusing agent may include an organic light diffusing agent, an inorganic light diffusing agent, or a mixture thereof. A mixture of an organic light diffusing agent and an inorganic light diffusing agent may improve diffusivity and transmittance of the low refractive index pattern layer or the high refractive index pattern layer. A single light diffusing agent may be used alone, or a mixture thereof may be used. The organic light diffusing agent may include at least one of (meth)acrylic particles, siloxane particles, and/or styrene particles. The inorganic light diffusing agent may include at least one of calcium carbonate, barium sulfate, titanium dioxide, aluminum hydroxide, silica, glass, talc, mica, white carbon, magnesium oxide, and/or zinc oxide. For example, the inorganic light diffusing agent can help prevent (or reduce) deteriorations in whiteness while further improving light diffusivity as compared to a light diffusing agent including the organic light diffusing agent alone.

The light diffusing agent is not limited to a particular shape and particle diameter. In some embodiments, the light diffusing agent may include spherical crosslinked particles, and may have an average particle diameter (D50) of about 0.1 µm to about 30 µm, for example about 0.5 µm to about 10 µm, or about 1 µm to about 5 µm. Within these ranges, the light diffusing agent can realize the light diffusion effect, increase surface roughness of the pattern layer (thereby improving bonding strength to the second protective layer), and can secure good dispersion.

The light diffusing agent may be present in an amount of about 0.1 wt % to about 20 wt %, for example about 1 wt % to about 15 wt % in the high refractive index pattern layer alone, in the low refractive index pattern layer alone, or based on the total of the high refractive index pattern layer and the low refractive index pattern layer. Within these ranges, the light diffusing agent can secure the light diffusion effect. When the low refractive index pattern layer employs the light diffusing agent, it is possible to select a resin with a wide range of refractive indices and to reduce manufacturing costs.

Next, the second protective layer 130 is described. The second protective layer 130 may be formed on the high refractive index pattern layer 122 or the low refractive index pattern layer 121 to protect the optical film 120 while supporting the optical film 120. As shown in FIG. 2, the second protective layer 130 may be directly formed on the high refractive index pattern layer 122. However, it is understood that the present invention is not limited thereto. Alternatively, the second protective layer 130 may be formed on the low refractive index pattern layer 121. That is, FIG. 2 shows a structure in which the low refractive index pattern layer 121, the high refractive index pattern layer 122 and the second protective layer 130 are sequentially stacked in this order. However, in some embodiments, the second protective layer 130, the low refractive index pattern layer 121 and the high refractive index pattern layer 122 may be sequentially stacked in this order, where the second protective layer 130 may be integrated with the second polarizer 110 via a bonding layer.

The second protective layer 130 may have an Re of about 8,000 nm or greater, or about 10,000 nm or greater, for example higher than about 10,000 nm, or about 10,100 nm to about 15,000 nm. Within these ranges, the second protective layer 130 can prevent (or reduce the occurrence of) visible rainbow spots. The second protective layer 130 may be a film formed by stretching an optically transparent resin in a uniaxial or biaxial direction. For example, the optically transparent resin may include at least one selected from polyesters including polyethylene terephthalate (PET), polybutylene terephthalate, polyethylene naphthalate, polybutylene naphthalate, or the like; acrylic resins; cellulose esters including cyclic olefin polymers (COP), triacetyl cellulose (TAC), or the like; polyvinyl acetate; polyvinyl chloride (PVC); polynorbornene, polycarbonate (PC), polyamide, polyacetal, polyphenylene ether, polyphenylene sulfide, polysulfone, polyether sulfone, polyarylate, and polyimide. The second protective layer may include a film formed by modification of the aforementioned resins. Modification may include copolymerization, branching, crosslinking, or modification of a terminal moiety. The second protective layer 130 may be integrated with the optical film 120. As used herein, the term "integrated" means that the second protective layer 130 and the optical film 120 are not independent of, or separate from each other.

Although not shown in FIG. 2, a bonding layer may be formed between the second polarizer 110 and the optical film 120. In embodiments, the bonding layer may be formed of a photo-curable bonding agent including an epoxy resin, a (meth)acrylic monomer, and a photo-initiator, or a water-based bonding agent of polyvinyl alcohol. The bonding layer may further include a light diffusing agent to improve the light diffusion effect.

In addition, although not shown in FIG. 2, a functional layer may be further formed on the second protective layer 130. With respect to the second protective layer 130, the functional layer may provide at least one function such as an anti-reflection, low reflection, hard coating, anti-glare, anti-fingerprint, anti-contamination, diffusion, and/or refraction function. In embodiments, the functional layer may be formed as a separate layer on the second protective layer 130. For example, the functional layer may be formed on the second protective layer 130 by coating a composition for the functional layer on the second protective layer 130, or the functional layer may be deposited on the second protective layer 130 via a bonding layer or an adhesive layer. In embodiments, the functional layer may be integral with one surface of the second protective layer 130.

Figure 4:
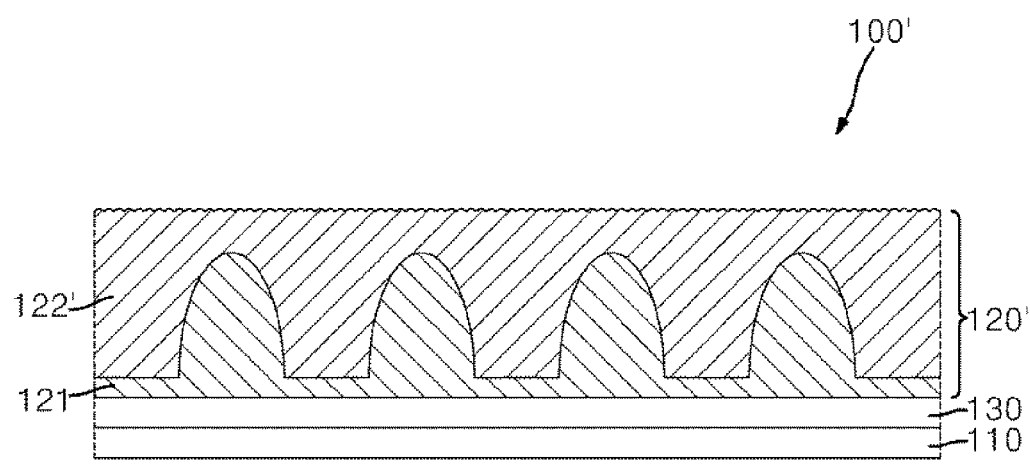
FIG. 4 is a schematic cross-sectional view of a second polarizing plate of a liquid crystal display module according to embodiments of the present invention.

Further, although not shown in FIG. 2, in the structure in which the second protective layer 130, the low refractive index pattern layer 121 and the high refractive index pattern layer 122 are sequentially stacked in this order, the functional layer may be formed as a separate layer on the high refractive index pattern layer 122. Referring to FIG. 4, a second polarizing plate 100' may include an optical film 120' that includes a high refractive index pattern layer 122', one surface of which is subjected to surface treatment to provide at least one of the aforementioned functions to the surface of the high refractive index pattern layer 122'. For example, the high refractive index pattern layer 122' may be formed such that one surface of the high refractive index pattern layer 122' has roughness, or may be subjected to surface treatment using fine particles such that one surface thereof becomes a functional layer.

Next, a method for manufacturing a second polarizing plate according to embodiments is described.

First, a stack structure of a second protective layer and an optical film may be formed. For example, a resin for a high refractive index pattern layer may be coated onto one surface of the second protective layer. The coating method is not limited to a particular method. For example, the coating may be performed by bar coating, spin coating, dip coating, roll coating, flow coating, die coating, or the like. Then, a pattern may be transferred to the coating layer using a pattern film having an embossed filling pattern and a flat portion formed thereon. Thereafter, a resin for the low refractive index pattern layer may be coated and filled onto the transferred pattern, followed by curing. Curing may be performed by at least one of photocuring or thermal curing. Photocuring may be performed using light at a wavelength of 400 nm or lower at about 10 mJ/cm$^2$ to about 1000 mJ/cm$^2$. Thermal curing may be performed at about 40° C. to about 200° C. for about 1 hour to about 30 hours. Under these conditions, the resin for the pattern layer can be sufficiently cured.

Then, a second polarizer may be fabricated. The second polarizer may be fabricated by any suitable method. In embodiments, the second polarizer may be fabricated by swelling, stretching and dyeing a polyvinyl alcohol film. Swelling, stretching and dyeing may be performed by any suitable method, such as those known to those of ordinary skill in the art. In embodiments, the second polarizer may be fabricated by dehydrating a polyvinyl alcohol film.

Then, a second polarizing plate may be fabricated by coating a bonding agent for polarizing plates onto one surface of the optical film of the stack structure to form a bonding layer, attaching the second polarizer to the optical film via the bonding layer, and curing the bonding layer.

Figure 5:
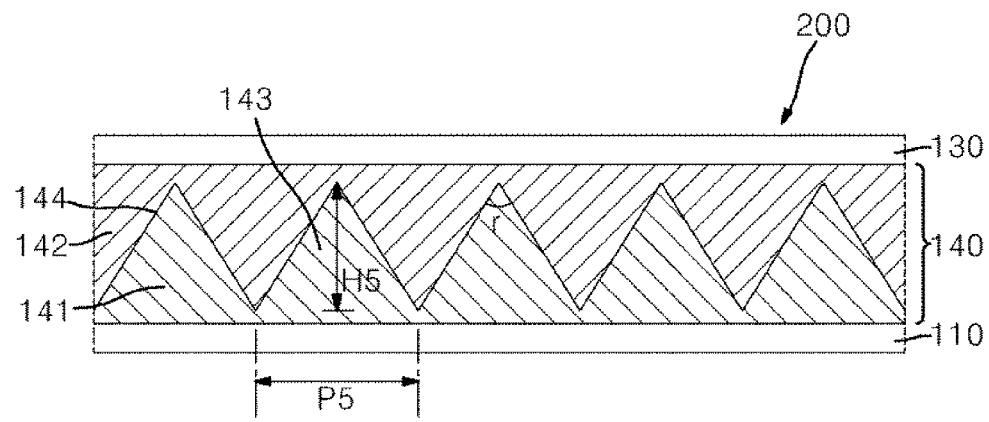
FIG. 5 is a schematic cross-sectional view of a second polarizing plate of a liquid crystal display module according to embodiments of the present invention.

Next, a liquid crystal display module according to embodiments of the present invention is described with reference to FIG. 5. FIG. 5 is a schematic cross-sectional view of a second polarizing plate according to embodiments of the invention. The liquid crystal display module may include a first polarizing plate, a liquid crystal panel, and a second polarizing plate. The liquid crystal display module is substantially the same as the liquid crystal display module described above except that the liquid crystal display module includes the second polarizing plate shown in FIG. 5 instead of the second polarizing plate shown in FIG. 2. Accordingly, the following description will focus on the second polarizing plate shown in FIG. 5.

Referring to FIG. 5, the second polarizing plate 200 may include a second polarizer 110, an optical film 140 including a low refractive index pattern layer 141 and a high refractive index pattern layer 142, and a second protective layer 130. The second polarizer 110 and the second protective layer 130 are substantially the same as those of the second polarizing plate describe above, and thus the following description will focus on the optical film 140.

The optical film 140 may be disposed between the second polarizer 110 and the second protective layer 130 and may diffuse polarized light received from the second polarizer 110. With this structure, the optical film can increase the contrast ratio and viewing angle at the side surfaces of the liquid crystal display while also improving the brightness uniformity of the liquid crystal display.

Referring to FIG. 5, the optical film 140 may include a high refractive index pattern layer 142 having one or more engraved prism patterns 144 formed thereon and a low refractive index pattern layer 141 having a filling pattern 143 filling at least a portion of the engraved prism patterns 144.

FIG. 5 shows the second polarizing plate that includes the engraved prism pattern 144 having a triangular cross-section. However, the second polarizing plate may include a prism pattern having an n-gonal (n being an integer from 4 to 10) cross-section. In addition, although the optical film shown in FIG. 5 does not include the flat portion, the optical film may further include the flat portion 126 as shown in FIG. 2 between the engraved prism patterns 144. In some embodiments, roughness may be further formed on the engraved prism pattern shown in FIG. 5 to further improve the light diffusion effect. In other embodiments, the engraved prism pattern shown in FIG. 5 may include a curved surface at a top portion thereof.

The engraved prism pattern 144 may have a pitch P5 of about 5 µm to about 20 µm, for example about 7 µm to about 15 µm. The engraved prism pattern 144 may have a height H5 of about 3 µm to about 16 µm, for example about 4 µm to about 16 µm. The engraved prism pattern 144 may have a vertex angle γ of about 55° to about 90°, for example about 65° to about 80°. The engraved prism pattern 144 may have an aspect ratio of about 1.0 or less, for example about 0.50 to about 0.96, or about 0.6 to about 0.8. Within these ranges of the pitch, height, vertex angle and aspect ratio, the engraved prism pattern 144 can provide the light diffusion effect.

Figure 6:
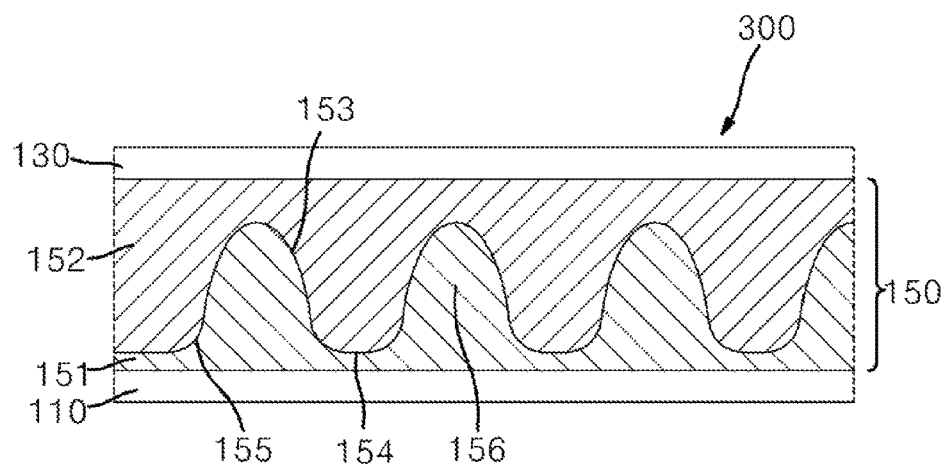
FIG. 6 is a schematic cross-sectional view of a second polarizing plate of a liquid crystal display module according to embodiments of the present invention.

Next, a liquid crystal display module is described with reference to FIG. 6. FIG. 6 is a cross-sectional view of a second polarizing plate in the liquid crystal display module. The liquid crystal display module may include a first polarizing plate, a liquid crystal panel and a second polarizing plate. The liquid crystal display module is substantially the same as the liquid crystal display module described above except that the liquid crystal display module includes the second polarizing plate shown in FIG. 6 instead of the second polarizing plate shown in FIG. 2. The following description focuses on the second polarizing plate shown in FIG. 6.

Referring to FIG. 6, the second polarizing plate 300 may include a second polarizer 110, an optical film 150 including a low refractive index pattern layer 151 and a high refractive index pattern layer 152, and a second protective layer 130. The high refractive index pattern layer 152 may include an engraved pattern 153 and a flat portion 154, and may further include a curved surface 155 formed at an interface between the engraved pattern 153 and the flat portion 154. With this structure, the second polarizing plate can provide a high light diffusion effect. The low refractive index pattern layer 151 may include a filling pattern 156 that fills the engraved pattern 153.

Figure 7:
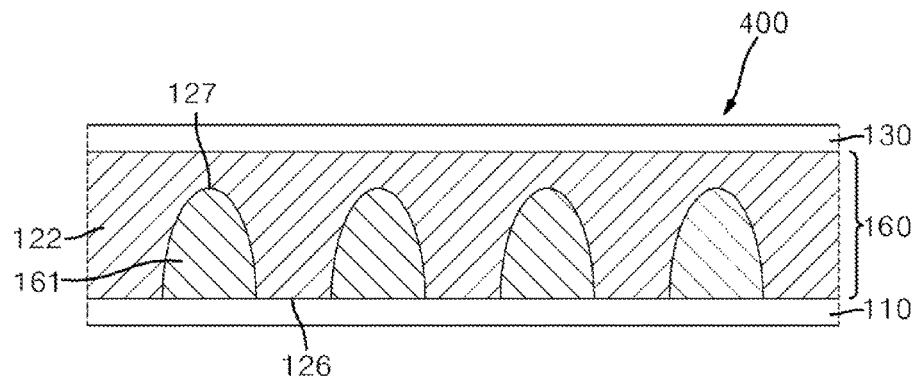
FIG. 7 is a schematic cross-sectional view of a second polarizing plate of a liquid crystal display module according to embodiments of the present invention.

Next, a liquid crystal display module is described with reference to FIG. 7. FIG. 7 is a cross-sectional view of a second polarizing plate of the liquid crystal display module. The liquid crystal display module may include a first polarizing plate, a liquid crystal panel, and a second polarizing plate. The liquid crystal display module is substantially the same as the liquid crystal display module described above except that the liquid crystal display module includes the second polarizing plate shown in FIG. 7 instead of the second polarizing plate shown in FIG. 2. The following description focuses on the second polarizing plate shown in FIG. 7.

Referring to FIG. 7, the second polarizing plate 400 may include a second polarizer 110, an optical film 160 including a high refractive index pattern layer 122 and a low refractive index pattern layer 161, and a second protective layer 130. The high refractive index pattern layer 122 includes an engraved pattern 127 and a flat portion 126. The second polarizing plate 400 is substantially the same as the second polarizing plate shown in FIG. 2 except that the thickness of the low refractive index pattern layer 161 is the same as the height of the engraved pattern 127 in the second polarizing plate.

Figure 8:
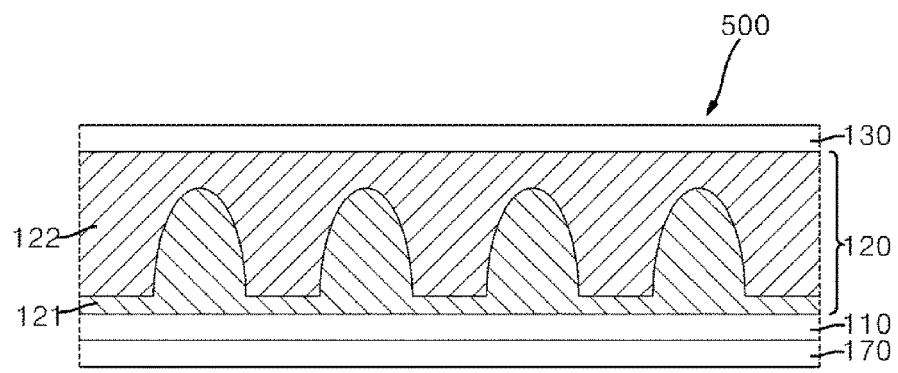
FIG. 8 is a schematic cross-sectional view of a second polarizing plate of a liquid crystal display module according to embodiments of the present invention.

Next, a liquid crystal display module is described with reference to FIG. 8. FIG. 8 is a cross-sectional view of a second polarizing plate of the liquid crystal display module. The liquid crystal display module may include a first polarizing plate, a liquid crystal panel, and a second polarizing plate. The liquid crystal display module is substantially the same as the liquid crystal display module described above except that the liquid crystal display module includes the second polarizing plate shown in FIG. 8 instead of the second polarizing plate shown in FIG. 2. The following description focuses on the second polarizing plate shown in FIG. 8.

Referring to FIG. 8, the second polarizing plate 500 may include a second polarizer 110, an optical film 120 including a low refractive index pattern layer 121 and a high refractive index pattern layer 122, a second protective layer 130, and a third protective layer 170. The second polarizing plate 500 is substantially the same as the second polarizing plate shown in FIG. 2 except that the second polarizing plate 500 further includes the third protective layer 170.

The third protective layer 170 may be formed on a lower surface of the second polarizer 110 to protect the second polarizer 110 while also suppressing warpage of the second polarizing plate 500 together with the second protective layer 130 under severe conditions.

The third protective layer 170 may be a film formed by stretching an optically transparent resin in a uniaxial or biaxial direction. For example, the optically transparent resin may include at least one selected from polyesters including polyethylene terephthalate, polybutylene terephthalate, polyethylene naphthalate, polybutylene naphthalate, or the like; acrylic resins; cellulose esters including cyclic olefin polymer, triacetyl cellulose, or the like; polyvinyl acetate; polyvinyl chloride; polynorbornene, polycarbonate, polyamide, polyacetal, polyphenylene ether, polyphenylene sulfide, polysulfone, polyether sulfone, polyarylate, and polyimide. The third protective layer 170 may include a film formed by modification of the aforementioned resins. Modification may include copolymerization, branching, crosslinking, or modification of a terminal moiety. The third protective layer 170 may have a specified range of retardation to provide a viewing angle compensation function. For example, the third protective layer 170 may have an Re of about 40 nm to about 60 nm at a wavelength of 550 nm. Within these ranges, the third protective layer can provide viewing angle compensation to provide good image quality.

Although the optical film 120 is shown as being formed between the second protective layer 130 and the second polarizer 110 in FIG. 8, the optical film 120 may be formed between the second polarizer 110 and the third protective layer 170. That is, the second polarizing plate may have a structure in which the third protective layer 170, the low refractive index pattern layer 121, the high refractive index pattern layer 122, the second polarizer 110, and the second protective layer 130 are sequentially formed in this order.

Although not shown in FIG. 8, an adhesive layer may be formed on a lower surface of the third protective layer 170 to facilitate adhesion between the third protective layer 170 and the liquid crystal panel 30. The adhesive layer is the same as the adhesive layer described above. Although not shown in FIG. 8, a bonding layer may also be formed between the second polarizer 110 and the third protective layer 170.

Figure 9:
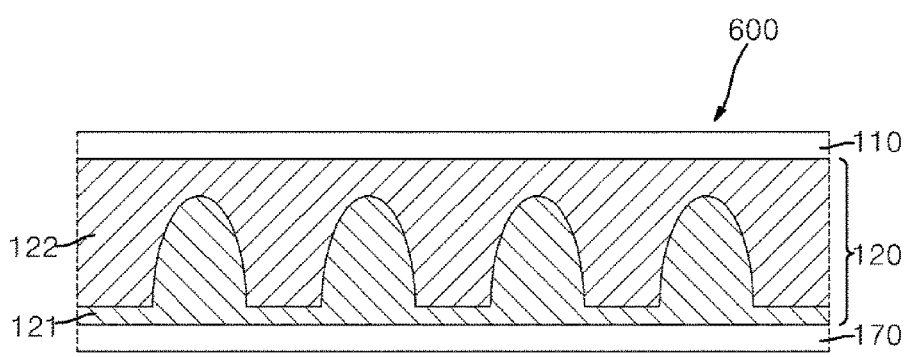
FIG. 9 is a schematic cross-sectional view of a second polarizing plate of a liquid crystal display module according to embodiments of the present invention.

Next, a liquid crystal display module is described with reference to FIG. 9. FIG. 9 is a cross-sectional view of a second polarizing plate of the liquid crystal display module. The liquid crystal display module may include a first polarizing plate, a liquid crystal panel, and a second polarizing plate. The liquid crystal display module is substantially the same as the liquid crystal display module described above except that the liquid crystal display module includes the second polarizing plate shown in FIG. 9 instead of the second polarizing plate shown in FIG. 2. The following description focuses on the second polarizing plate shown in FIG. 9.

Referring to FIG. 9, the second polarizing plate 600 includes a second polarizer 110, an optical film 120 including a low refractive index pattern layer 121 and a high refractive index pattern layer 122, and a third protective layer 170. The second polarizing plate is substantially the same as the second polarizing plate 500 shown in FIG. 8 except that the optical film 120 is disposed under the second polarizer 110 and is directly formed on the third protective layer 170, and the second protective layer 130 is excluded.

Figure 10:
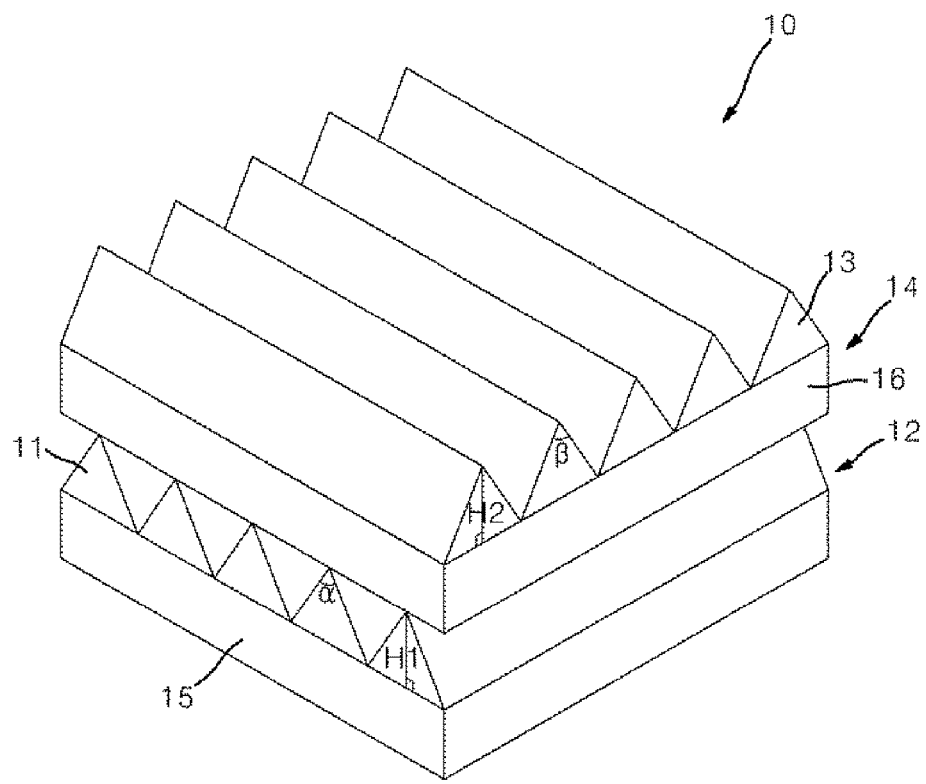
FIG. 10 is a schematic perspective view of a composite optical sheet of a liquid crystal display module according to embodiments of the present invention.

Next, a liquid crystal display module is described with reference to FIG. 10. FIG. 10 is a perspective view of a composite optical sheet of the liquid crystal display module. The liquid crystal display module may include a composite optical sheet, a first polarizing plate, a liquid crystal panel, and a second polarizing plate. The liquid crystal display module is substantially the same as the liquid crystal display module described above excluding the composite optical sheet. The composite optical sheet may be disposed under the first polarizing plate and collect light incident on a lower side thereof. The following description focuses on the composite optical sheet.

Referring to FIG. 10, the composite optical sheet 10 may include a first optical sheet 12 including one or more first prism patterns 11 formed on one surface thereof, and a second optical sheet 14 formed on the first optical sheet 12 and including one or more second prism patterns 13 formed on one surface thereof.

The composite optical sheet 10 may allow light to exit at an exit angle of about −40° to about +40°, for example about −30° to about +30°, or about −28° to about +28°. Within these ranges of exit angles, the composite optical sheet may collect light before the light exits through the liquid crystal panel by suppressing exit of the light through a side surface of the composite optical sheet, thereby increasing contrast ratio at the side surface.

The first optical sheet 12 may be disposed on a lower surface of the second optical sheet 14. The first optical sheet 12 has a light exit plane corresponding to an upper surface thereof and a light incident plane corresponding to a lower surface thereof for changing the optical path of incident light to allow the light to exit to the second optical sheet 14. The first optical sheet 12 may include a first base film 15 and at least one first prism pattern 11 formed on the first base film 15.

The first base film 15 may support the first optical sheet 12 and has a thickness of about 10 μm to about 500 μm, for example about 25 μm to about 250 μm, or about 75 μm to about 150 μm, but the first base film is not limited thereto. Within these ranges, the first base film can be used in a liquid crystal display. The first base film 15 may be formed of a thermoplastic resin or a composition comprising the same. For example, the thermoplastic resin may include at least one selected from polyester resins such as polyethylene terephthalate and polyethylene naphthalate, polyacetal resins, acrylic resins, polycarbonate resins, styrene resins, vinyl resins, polyphenylene ether resins, non-cyclic polyolefin resins such as polyethylene and polypropylene, cyclic olefin resins, acrylonitrile-butadiene-styrene copolymer resins, polyacrylate resins, polyaryl sulfone resins, polyether sulfone resins, polyphenylene sulfide resins, fluorine resins, and (meth)acrylic resins.

The first prism patterns 11 may be formed on the upper surface of the first optical sheet 12 and may collect light received from a lower surface thereof while also improving brightness. Although FIG. 10 shows a prism pattern having a triangular cross-section, it is understood that embodiments of the present invention are not limited thereto and the first prism patterns 11 may have any suitable shape, such as, for example a polygonal prism shape, the number of sides of which may range from 4 to 10. The first prism patterns 11 may have a height H1 of about 5 μm to about 50 μm, for example about 5 μm to about 40 μm, or about 10 μm to about 30 μm. The first prism patterns 11 may have a vertex angle ($\alpha$) of about 80° to about 100°, for example about 85° to about 95°. Within these ranges of height and vertex angle, the first prism patterns can improve brightness while also suppressing the Moiré phenomenon. The first prism pattern 11 may have an aspect ratio of about 0.3 to about 0.7, for example about 0.4 to about 0.6. Within these ranges, the first prism pattern can improve brightness. The first prism pattern 11 may be formed of a composition including a UV-curable unsaturated compound and an initiator, or may be formed of the same or different material than the material of the first base film 15. By way of example, the UV-curable unsaturated compound may include at least one selected from epoxy (meth)acrylate, urethane (meth)acrylate, phenyl phenol ethoxylated (meth)acrylate, trimethylolpropane ethoxylated (meth)acrylate, fluorene derived unsaturated resins, phenoxybenzyl (meth)acrylate, phenylphenoxyethyl (meth)acrylate, ethoxylated thiodiphenyl di(meth)acrylate, phenylthioethyl (meth)acrylate monomers or oligomers thereof, but the UV-curable unsaturated compound is not limited thereto. The initiator may be a photoinitiator and may include a ketone or phosphine oxide-based initiator, but is not limited thereto. The first prism pattern 11 may have an elongated shape extending in a stripe shape, and the longitudinal direction of the first prism pattern is substantially the same as the vertical direction thereof. As used herein, the expression "substantially the same" refers to both values that are completely the same and values that are slightly different.

The second optical sheet 14 may be disposed on an upper surface of the first optical sheet 12, and may have a light exit plane corresponding to an upper surface thereof and a light incident plane corresponding to a lower surface thereof for changing the optical path of light received from the first optical sheet 12. The second optical sheet 14 may include a second base film 16 and a second prism pattern 13 formed on the second base film 16.

The second base film 16 may support the second optical sheet 14 and may have a thickness of about 10 μm to about 500 μm, for example about 25 μm to about 250 μm, or about 75 μm to about 150 μm. Within these ranges, the second base film can be used in a liquid crystal display. The second base film 16 may be formed of the same or different resin than the first base film 15. The thickness of the second base film 16 may be the same as or different from the thickness of the first base film 15.

The second prism pattern 13 may be formed on the upper surface of the second optical sheet 14 and may collect light received from the lower surface thereof while also improving brightness. Although FIG. 10 shows a prism pattern having a triangular cross-section, it is understood that embodiments of the present invention are not limited thereto, and the second prism pattern 13 may have any suitable shape, such as, for example a polygonal prism shape, the number of sides of which ranges from 4 to 10. The second prism pattern 13 may be formed of the same or different kind of resin than the first prism pattern 11. The second prism pattern 13 may have a height H2 of about 5 μm to about 50 μm, for example about 5 μm to about 40 μm, or about 10 μm to about 30 μm. The second prism pattern 13 may have a vertex angle ($\beta$) of about 80° to about 100°, for example about 85° to about 95°. Within these ranges of height and vertex angle, the second prism pattern can improve brightness while suppressing the Moiré phenomenon. The second prism pattern 13 may have an aspect ratio of about 0.3 to about 0.7, for example about 0.4 to about 0.6. Within these ranges, the second prism patterns can improve brightness. A ratio ($A^2/A^1$) of the aspect ratio ($A^2$) of the second prism pattern 13 to the aspect ratio ($A^1$) of the first prism pattern 11 may range from about 0.9 to about 1.1. Within this range, the second prism pattern 13 may allow light to exit at an exit angle of about −40° to about +40°, thereby improving the contrast ratio at the side surfaces. The second prism pattern 13 may have an elongated shape extending in a stripe shape, and the longitudinal direction of the second prism pattern is substantially orthogonal to the longitudinal direction of the first prism pattern. As used herein, the expression "substantially orthogonal to" refers to both directions being completely orthogonal to each other as well as to the directions being substantially orthogonal but not necessarily completely orthogonal to each other.

The liquid crystal display module may further include a diffuser disposed between the composite optical sheet 10 and the first polarizing plate 20. The diffuser may protect the composite optical sheet 10 and may include a light diffusing agent. The diffuser and a light source may be sequentially disposed under the composite optical sheet 10.

FIG. 10 shows a structure in which the second optical sheet 14 is stacked on the first optical sheet 12 without a bonding layer therebetween. In embodiments, the composite optical sheet may further include a bonding layer formed on the lower surface of the second optical sheet 14 such that the first prism pattern 11 of the first optical sheet 12 may infiltrate the bonding layer. The bonding layer may prevent (or reduce) deformation of the first optical sheet and the second optical sheet, thereby preventing (or reducing) sheet wrinkling and the Moiré phenomenon. The bonding layer may be formed of any suitable bonding resin, for example, an acrylic or methacrylic acid ester resin. The bonding layer may have a thickness of about 1 μm to about 10 μm, for example about 2 μm to about 8 μm. Within these ranges, the bonding layer can provide sufficient bonding strength.

Figure 11:
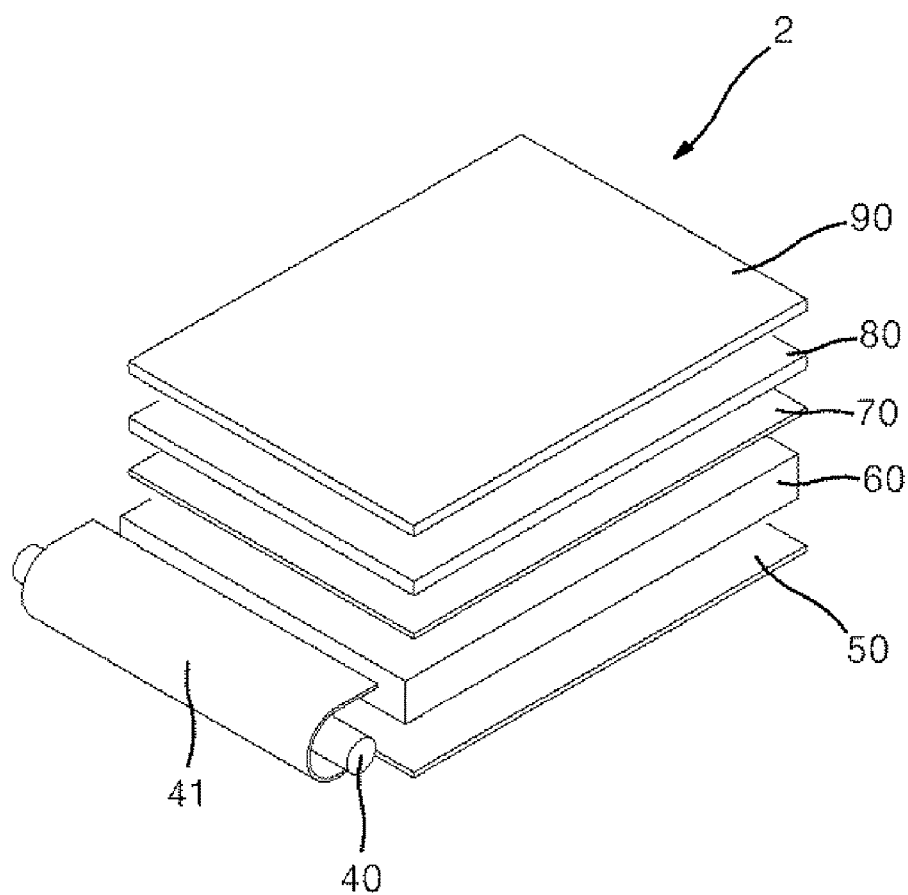
FIG. 11 is a schematic perspective view of a liquid crystal display according to embodiments of the present invention.

Next, a liquid crystal display is described with reference to FIG. 11. FIG. 11 is a perspective view of the liquid crystal display. Referring to FIG. 11, the liquid crystal display 2 may include a light source 40, a light guide plate 60 for guiding light emitted from the light source 40, a reflective sheet 50 disposed below the light guide plate 60, a diffusive sheet 70 disposed above the light guide plate 60, a liquid crystal display module 80 disposed above the diffusive sheet 70, and a window film 90 disposed above the liquid crystal display module 80. The liquid crystal display module 80 may include the liquid crystal display module described above.

The light source 40 may generate light and may be disposed at a lateral side of the light guide plate 60 (edge type). The light source 40 may be a linear light lamp, a surface light lamp, or any of various other light sources such as a CCFL or LED. A light source cover 41 may be disposed on the outside of the light source 40.

The light guide plate 60 may guide light emitted from the light source 40 to the diffusive sheet 70. When a direct type light source is used, the light guide plate can be omitted.

The reflective sheet 50 may reflect light emitted from the light source 40 to guide the light to the diffusive sheet 70.

The diffusive sheet 70 may diffuse and scatter the light received from the light guide plate 60 to supply the light to the liquid crystal display.

Although the light source 40 is disposed at a lateral side of the light guide plate 60 in the liquid crystal display shown in FIG. 11, the light source 40 may be disposed on a lower surface of the light guide plate 60 (direct type). In this structure, the light guide plate 60 can be omitted and the liquid crystal display may further include a diffuser.

Hereinafter, embodiments of the present invention are described with reference to some examples. However, it is understood that these examples are provided for illustration only and are not to be construed in any way as limiting the present invention.

Preparative Example 1: Manufacture of Composite Optical Sheet

A composition was prepared including 35 wt % of epoxy acrylate, 15 wt % of a urethane acrylate oligomer, 36 wt % of ortho-phenyl phenol ethoxylated acrylate, 10 wt % of trimethylolpropane 9-ethoxylated acrylate, and 4 wt % of a photo initiator.

The composition was coated onto one surface of a polyethylene terephthalate (PET) film (T910E, thickness: 125 μm, Mitsubishi Co., Ltd.) as a first base film to form a coating layer. A prism pattern (triangular cross-section, height: 12 μm, pitch: 24 μm, vertex angle: 90°) was transferred from a pattern roll having a corresponding embossed pattern to the coating layer, followed by curing, thereby forming a first optical sheet having a first prism pattern formed thereon.

The composition was coated onto one surface of a polyethylene terephthalate (PET) film (T910E, thickness: 125 μm, Mitsubishi Co., Ltd.) as a second base film to form a coating layer. A prism pattern (triangular cross-section, height: 12 μm, pitch: 24 μm, vertex angle: 90°) was transferred from a pattern roll having a corresponding embossed pattern to the coating layer, followed by curing, thereby forming a second optical sheet having a second prism pattern formed thereon.

A composite optical sheet was manufactured by stacking the second optical sheet on the first optical sheet such that the longitudinal direction of the first prism pattern was orthogonal to the longitudinal direction of the second prism pattern.

Exit angle was measured by a method of measuring viewing angle with respect to the composite optical sheet.

Preparative Example 2: Manufacture of Composite Optical Sheet

A composite optical sheet was manufactured as in Preparative Example 1 except that a microlens pattern as listed in Table 1 was formed on one surface of a polyethylene terephthalate (PET) film as a first base film instead of the prism pattern.

TABLE 1

| | First optical sheet | | | | Second optical sheet | | | | Exit angle (°) |
|---|---|---|---|---|---|---|---|---|---|
| | Pattern | Height (μm) | Pitch (μm) | Aspect ratio | Pattern | Height (μm) | Pitch (μm) | Aspect ratio | |
| Preparative Example 1 | Prism | 12 | 24 | 0.5 | Prism | 12 | 24 | 0.5 | −28/+28 |
| Preparative Example 2 | Microlens | 15 | 30 | 0.5 | Prism | 12 | 24 | 0.5 | −40/+40 |

Preparative Example 3: Manufacture of First Polarizing Plate

A first polarizer was manufactured by stretching a polyvinyl alcohol film at 60° C. to three times its initial length and adsorbing iodine to the stretched film, followed by stretching the resulting film to 2.5 times the stretched length of the film in an aqueous solution of boric acid at 40° C. Triacetylcellulose films (thickness 80 μm) were bonded as first protective layers to both surfaces of the first polarizer via a bonding agent for polarizers (Z-200, Nippon Goshei Co., Ltd.), thereby providing a first polarizing plate.

Example 1: Manufacture of Liquid Crystal Display Module (1) Manufacture of Second Polarizing Plate A polarizer was manufactured as in Preparative Example 3.

A UV-curable resin (SSC155, Shin-A T&C) was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index pattern layer. Then, a UV-curable resin (SSC140, Shin-A T&C) was coated onto the high refractive index pattern layer such that the engraved lenticular lens pattern could be completely filled with the UV-curable resin, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of the low refractive index pattern layer, which in turn was bonded to the fabricated polarizer, followed by curing, thereby fabricating a second polarizing plate.

(2) Manufacture of Liquid Crystal Display Module

The composite optical sheet fabricated in Preparative Example 1, the first polarizing plate fabricated in Preparative Example 3, a liquid crystal panel (PVA mode), and the fabricated second polarizing plate were sequentially assembled, thereby fabricating a liquid crystal display module.

Example 2: Manufacture of Liquid Crystal Display Module (1) Manufacture of Second Polarizing Plate A polarizer was manufactured as in Preparative Example 3.

A UV-curable resin (SSC155, Shin-A T&C) was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed prism pattern (pitch: 13 μm, height: 10 μm, vertex angle: 65.5°, triangular cross-section) formed thereon, an engraved prism pattern was formed on the coating layer, followed by curing, thereby forming a high refractive index pattern layer. Then, a UV-curable resin (SSC140, Shin-A T&C) was coated onto the high refractive index pattern layer such that the engraved prism pattern could be completely filled with the UV-curable resin, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of the low refractive index pattern layer, which in turn was bonded to the fabricated polarizer, followed by curing, thereby fabricating a second polarizing plate.

(2) Manufacture of Liquid Crystal Display Module

The composite optical sheet fabricated in Preparative Example 1, the first polarizing plate fabricated in Preparative Example 3, a liquid crystal panel (PVA mode), and the fabricated second polarizing plate were sequentially assembled, thereby fabricating a liquid crystal display module.

Example 3: Manufacture of Liquid Crystal Display Module

A polarizer was manufactured as in Preparative Example 3.

A UV-curable resin (SSC155, Shin-A T&C) was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index pattern layer. Then, a UV-curable resin (SSC143, Shin-A T&C) was coated onto the high refractive index pattern layer such that the engraved lenticular lens pattern could be completely filled with the UV-curable resin, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of each of the low refractive index pattern layer and a TAC film as a third protective film (KC4DR-1, thickness: 40 μm, Konica Co., Ltd.), which in turn were bonded to the fabricated polarizer, followed by curing, thereby fabricating a second polarizing plate.

The composite optical sheet fabricated in Preparative Example 1, the first polarizing plate fabricated in Preparative Example 3, a liquid crystal panel (PVA mode), and the fabricated second polarizing plate were sequentially assembled, thereby fabricating a liquid crystal display module.

Example 4: Manufacture of Liquid Crystal Display Module

A polarizer was manufactured as in Preparative Example 3.

A UV-curable resin (SSC155, Shin-A T&C) was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed prism pattern (pitch: 13 μm, height: 10 μm, vertex angle: 65.5°, triangular cross-section) formed thereon, an engraved prism pattern was formed on the coating layer, followed by curing, thereby forming a high refractive index pattern layer. Then, a UV-curable resin (SSC143, Shin-A T&C) was coated onto the high refractive index pattern layer such that the engraved prism pattern could be completely filled with the UV-curable resin, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of each of the low refractive index pattern layer and a TAC film as a third protective film (KC4DR-1, thickness: 40 μm, Konica Co., Ltd.), which in turn were bonded to the fabricated polarizer, followed by curing, thereby fabricating a second polarizing plate.

The composite optical sheet fabricated in Preparative Example 1, the first polarizing plate fabricated in Preparative Example 3, a liquid crystal panel (PVA mode), and the fabricated second polarizing plate were sequentially assembled, thereby fabricating a liquid crystal display module.

Example 5: Manufacture of Liquid Crystal Display Module (1) Manufacture of Second Polarizing Plate A polarizer was manufactured as in Preparative Example 3.

A composition for a high refractive index pattern layer was prepared by mixing 100 parts by weight of a UV curable resin (SSC157, Shin-A T&C) and 4 parts by weight of a silicone-based light diffusing agent (particle diameter: 4 μm, Momentive, Tospearl 145), followed by dispersion.

The prepared composition was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index pattern layer. Then, a UV-curable resin (SSC140, Shin-A T&C) was coated onto the high refractive index pattern layer such that the engraved lenticular lens pattern could be completely filled with the UV-curable resin, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of the low refractive index pattern layer, which in turn was bonded to the fabricated polarizer, followed by curing, thereby fabricating a second polarizing plate.

(2) Manufacture of Liquid Crystal Display Module

The composite optical sheet fabricated in Preparative Example 1, the first polarizing plate fabricated in Preparative Example 3, a liquid crystal panel (PVA mode), and the fabricated second polarizing plate were sequentially assembled, thereby fabricating a liquid crystal display module.

Example 6: Manufacture of Liquid Crystal Display Module

A liquid crystal display module was manufactured as in Example 5 except that the content of the light diffusing agent was modified as listed in Table 3.

Example 7: Manufacture of Liquid Crystal Display Module

A liquid crystal display module was manufactured as in Example 6 except that the content of the light diffusing agent was modified as listed in Table 3.

Example 8: Manufacture of Liquid Crystal Display Module

A polarizer was manufactured as in Preparative Example 3.

A composition for a high refractive index pattern layer was prepared by mixing 100 parts by weight of a UV curable resin (SSC155, Shin-A T&C) and 4 parts by weight of a silicone-based light diffusing agent (particle diameter: 4 μm, Momentive, Tospearl 145), followed by dispersion.

The prepared composition was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index pattern layer. Then, a UV-curable resin (SSC145, Shin-A T&C) was coated onto the high refractive index pattern layer such that the engraved lenticular lens pattern could be completely filled with the UV-curable resin, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of the low refractive index pattern layer, which in turn was bonded to the fabricated polarizer, followed by curing, thereby fabricating a second polarizing plate.

A liquid crystal display module was manufactured using the fabricated second polarizing plate as in Example 1.

Example 9: Manufacture of Liquid Crystal Display Module

A liquid crystal display module was manufactured as in Example 8 except that the content of the light diffusing agent was modified as listed in Table 3.

Example 10: Manufacture of Liquid Crystal Display Module

A polarizer was manufactured as in Preparative Example 3.

A composition for a low refractive index pattern layer was prepared by mixing 100 parts by weight of a UV curable resin(SSC140, Shin-A T&C) and 10 parts by weight of a silicone-based light diffusing agent (particle diameter: 4 μm, Momentive, Tospearl 145), followed by dispersion.

A UV-curable resin (SSC157, Shin-A T&C) was coated onto one surface of a transparent PET film as a second protective layer (SRF, thickness: 80 μm, Re=14,000 nm at a wavelength of 550 nm, Toyobo Co., Ltd.) to form a coating layer. Using a film having an embossed lenticular lens pattern (pitch: 10 μm, height: 8 μm) and a flat portion (pitch: 10 μm) alternately formed thereon, an engraved lenticular lens pattern and a flat portion were formed on the coating layer, followed by curing, thereby forming a high refractive index pattern layer. Then, the prepared composition was coated onto the high refractive index pattern layer such that the engraved lenticular lens pattern could be completely filled with the composition, followed by curing, thereby forming an optical film having a low refractive index pattern layer directly formed on the high refractive index pattern layer.

A bonding agent for polarizing plates (Z-200, Nippon Goshei Co., Ltd.) was coated onto one surface of the low refractive index pattern layer, which in turn was bonded to the fabricated polarizer, followed by curing, thereby fabricating a second polarizing plate.

A liquid crystal display module was manufactured using the fabricated second polarizing plate as in Example 5.

Comparative Example 1: Manufacture of Liquid Crystal Display Module

A second polarizer was manufactured by stretching a polyvinyl alcohol film at 60° C. to three times its initial length and adsorbing iodine to the stretched film, followed by stretching the resulting film to 2.5 times the stretched length of the film in an aqueous solution of boric acid at 40° C.

A bonding agent for polarizing plates was applied to both surfaces of the second polarizer, which in turn was assembled to a transparent PET film as a second protective layer (SRF, thickness: 80 μm, Re=14,000 nm at a wavelength of 550 nm, Toyobo Co., Ltd.) and a TAC film as a third protective film (KC4DR-1, thickness: 40 μm, Konica Co., Ltd.), thereby fabricating a polarizing plate.

The composite optical sheet fabricated in Preparative Example 2, the first polarizing plate fabricated in Preparative Example 3, a liquid crystal panel (PVA mode), and the fabricated polarizing plate were sequentially assembled, thereby fabricating a liquid crystal display module.

Comparative Example 2: Manufacture of Liquid Crystal Display Module

A second polarizer was manufactured by stretching a polyvinyl alcohol film at 60° C. to three times its initial length and adsorbing iodine to the stretched film, followed by stretching the resulting film to 2.5 times the stretched length of the film in an aqueous solution of boric acid at 40° C.

A bonding agent for polarizing plates was applied to both surfaces of the second polarizer, which in turn was assembled to a transparent PET film as a second protective layer (SRF, thickness: 80 μm, Re=14,000 nm at a wavelength of 550 nm, Toyobo Co., Ltd.) and a TAC film as a third protective film (KC4DR-1, thickness: 40 μm, Konica Co., Ltd.), thereby fabricating a polarizing plate.

The composite optical sheet fabricated in Preparative Example 1, the first polarizing plate fabricated in Preparative Example 3, a liquid crystal panel (PVA mode), and the fabricated polarizing plate were sequentially assembled, thereby fabricating a liquid crystal display module.

Schematic configurations of the liquid crystal display modules manufactured according to the Examples and Comparative Examples are shown in Tables 2 and 3.

Figure 14:
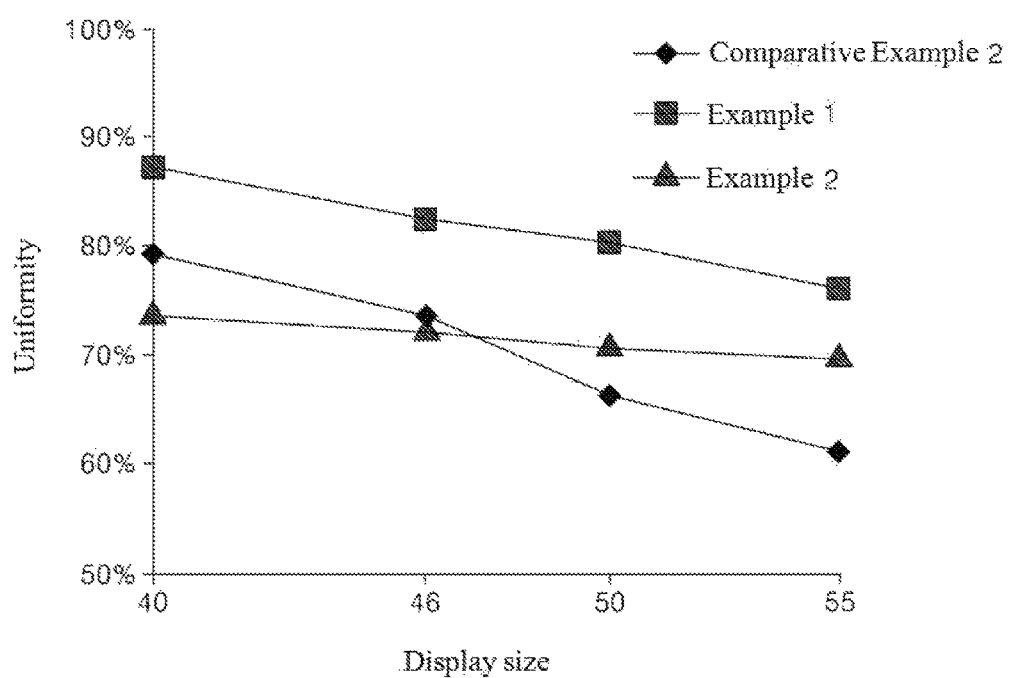
FIG. 14 is a graph comparing the brightness uniformity of Comparative Example 2 and Examples 1 and 2.

The liquid crystal display modules manufactured according to the Examples and Comparative Examples were evaluated as to the following properties, and the evaluation results are shown in Table 2, Table 3 and FIG. 14.

(1) Brightness: An LED light source, a light guide plate, and a liquid crystal display module were assembled to fabricate a liquid crystal display including an edge type LED light source at one side thereof (having the same configuration as a Samsung LED TV (UN32H5500) except for having the configuration of the liquid crystal display modules manufactured according to the respective one of the Examples and Comparative Examples). Front brightness was measured using an EZ CONTRAST X88RC (EZXL-176R-F422A4, ELDIM Co., Ltd.). Relative brightness was calculated using the equation, {(brightness of Examples and Comparative Examples)/(brightness of Comparative Example 1)}×100.

(2) ½ viewing angle and ⅓ viewing angle: A liquid crystal display was manufactured as in Evaluation Item 1 (i.e., the brightness evaluation), and brightness was measured using an EZ CONTRAST X88RC (EZXL-176R-F422A4, ELDIM Co., Ltd.). ½ viewing angle and ⅓ viewing angle refer to the viewing angles at which the brightness value reaches ½ and ⅓ of the front brightness, respectively.

(3) Contrast ratio: A liquid crystal display was manufactured as in Evaluation Item 1, and the spherical coordinate system (ϕ, θ) and contrast ratio were measured using an EZ CONTRAST X88RC (EZXL-176R-F422A4, ELDIM Co., Ltd.).

(4) Brightness uniformity: A liquid crystal display was manufactured by assembling an LED light source, a light guide plate, a liquid crystal display module, and a screen unit having a major axis and a minor axis. Referring to FIG. 13, in the liquid crystal display including the light source, the light guide plate and the liquid crystal display module, brightness was measured at each of points A, B and C, where the central point, the left end point and the right end point of the display screen are indicated by B, A and C, respectively, and the maximum brightness value (Brightness max) and the minimum brightness value (Brightness min) were obtained. Brightness uniformity was calculated using the equation, (Brightness min)/(Brightness max)×100. In measuring brightness, a brightness tester (EZ CONTRAST X88RC, EZXL-176R-F422A4, ELDIM Co., Ltd.) was secured to point B, and then directed to face each of the points A, B and C.

TABLE 2

| | | Example 1 | Example 2 | Example 3 | Example 4 | Comparative Example 1 | Comparative Example 2 |
|---|---|---|---|---|---|---|---|
| Composite optical sheet | | Preparative Example 1 | Preparative Example 1 | Preparative Example 1 | Preparative Example 1 | Preparative Example 2 | Preparative Example 1 |
| Exit angle (°) | | −28, +28 | −28, +28 | −28, +28 | −28, +28 | −40, +40 | −28, +28 |
| High refractive index pattern layer | Refractive index | 1.57 | 1.57 | 1.57 | 1.57 | — | — |
| | Engraved pattern | Lenticular | Prism | Lenticular | Prism | — | — |
| | Aspect ratio of engraved pattern | 1.0 | 0.77 | 1.0 | 0.77 | — | — |
| | Presence of flat portion | Present | Absent | Present | Absent | — | — |
| Low | Refractive | 1.42 | 1.42 | 1.45 | 1.45 | — | — |

TABLE 2-continued

|  |  | Example 1 | Example 2 | Example 3 | Example 4 | Comparative Example 1 | Comparative Example 2 |
|---|---|---|---|---|---|---|---|
| refractive index pattern layer | index |  |  |  |  |  |  |
| Brightness | Central brightness (nit) | 182 | 183 | 192 | 203 | 179 | 241 |
|  | Relative brightness (%) | 101 | 102 | 107 | 113 | 100 | 135 |
| ½ viewing angle (°) | Left-right | 65.5 | 70.3 | 62.9 | 60.8 | 69.0 | 50.4 |
|  | Up-down | 46.1 | 43.8 | 46.0 | 44.7 | 72.1 | 46.0 |
| ⅓ viewing angle (°) | Left-right | 82.2 | 82.5 | 77.5 | 73.2 | 90.6 | 60.6 |
|  | Up-down | 57.0 | 54.9 | 57.2 | 55.8 | 90.2 | 56.6 |
| Contrast ratio | (0°, 0°) | 12776 | 10389 | 12583 | 14672 | 13301 | 20207 |
|  | (180°, 0°) | 1383 | 1546 | 1416 | 1346 | 902 | 959 |
|  | (0°, 60°) | 1436 | 1579 | 1434 | 1470 | 907 | 973 |
| Brightness uniformity (%) | 40 inches | 87.8 | 74.5 | — | — | — | 79.3 |
|  | 46 inches | 84.5 | 73.1 | — | — | — | 73.6 |
|  | 50 inches | 80.5 | 71.7 | — | — | — | 66.1 |
|  | 55 inches | 77.1 | 70.7 | — | — | — | 61.1 |

TABLE 3

|  |  | Example 5 | Example 6 | Example 7 | Example 8 | Example 9 | Example 10 |
|---|---|---|---|---|---|---|---|
| Composite optical sheet |  | Preparative Example 1 | Preparative Example 1 | Preparative Example 1 | Preparative Example 1 | Preparative Example 1 | Preparative Example 1 |
| Exit angle (°) |  | −28, +28 | −28, +28 | −28, +28 | −28, +28 | −28, +28 | −28, +28 |
| High refractive index pattern layer | Refractive index | 1.60 | 1.60 | 1.60 | 1.57 | 1.57 | 1.60 |
|  | Pitch of engraved pattern (μm) | 10 | 10 | 10 | 10 | 10 | 10 |
|  | Pitch of engraved pattern (μm) | 10 | 10 | 8 | 10 | 10 | 8 |
|  | Aspect ratio of engraved pattern | 1.0 | 1.0 | 0.8 | 1.0 | 1.0 | 0.8 |
|  | Light diffusing agent (parts by weight) | 4 | 10 | 10 | 4 | 10 | — |
| Low refractive index pattern layer | Refractive index | 1.42 | 1.42 | 1.42 | 1.47 | 1.47 | 1.42 |
|  | Light diffusing agent (parts by weight) | — | — | — | — | — | 10 |
| Brightness | Central brightness (nit) | 185 | 180 | 180 | 186 | 183 | 182 |
|  | Relative brightness (%) | 103 | 101 | 101 | 104 | 102 | 102 |
| ½ viewing angle (°) | Left-right | 67 | 71 | 70 | 65 | 68 | 68 |
|  | Up-down | 47 | 51 | 50 | 45 | 48 | 47 |
| ⅓ viewing angle (°) | Left-right | 79 | 87 | 85 | 77 | 83 | 82 |
|  | Up-down | 59 | 64 | 63 | 57 | 61 | 60 |
| Contrast ratio | (0°, 0°) | 12105 | 11657 | 11948 | 12599 | 11914 | 12705 |
|  | (180°, 60°) | 1433 | 1599 | 1504 | 1402 | 1456 | 1420 |
|  | (0°, 60°) | 1485 | 1638 | 1556 | 1449 | 1503 | 1480 |

*Difference in refractive index: Refractive index of high refractive index pattern layer—Refractive index of low refractive index pattern layer As shown in Tables 2 and 3, the liquid crystal display modules manufactured according to the Examples had high front brightness, could increase side viewing angle by increasing the ½ viewing angle and the ⅓ viewing angle, and had high side contrast ratios. In addition, as shown in FIG. 14, the liquid crystal display modules manufactured according to the Examples could increase brightness uniformity, and had minimized variations in brightness uniformity based on screen size and therefore did not require changes to be made upon changing the size of the liquid crystal displays, thereby improving processability and economic feasibility. Accordingly, embodiments of the present invention provide liquid crystal display modules capable of increasing side contrast ratio, side viewing angle and brightness uniformity while minimizing variations in brightness uniformity depending upon screen size of the liquid crystal display, thereby providing good processability and economic feasibility.

On the contrary, the liquid crystal display module manufactured according to Comparative Example 1, which did not employ the optical film manufactured in the Examples, had low side contrast ratio and low relative brightness.

The liquid crystal display module of Comparative Example 2, which also did not employ the optical film manufactured according to the Examples, exhibited insignificant improvements in viewing angle and contrast ratio despite having high relative brightness. Further, as shown in FIG. 14, the liquid crystal display exhibited significant variation in brightness uniformity depending upon screen size of the liquid crystal display, and thus had low processability and economic feasibility, as compared to the liquid crystal display modules manufactured according to the Examples.

While certain exemplary embodiments of the present invention have been illustrated and described, those of ordinary skill in the art will understand that various modifications, changes, and alterations can be made to the described embodiments without departing from the spirit and scope of the invention, as defined in the following claims.

What is claimed is:
1. A liquid crystal display module comprising:
a first polarizing plate;
a second polarizing plate comprising:
  a polarizer, and
  an optical film on the polarizer, the optical film comprising:
    a high refractive index pattern resin layer having at least one engraved pattern having an aspect ratio of about 0.7 to about 1.0, and
    a low refractive index pattern resin layer having a filling pattern completely filling the at least one engraved pattern,
  wherein:
    the high refractive index pattern resin layer has a higher refractive index than the low refractive index pattern resin layer; and
a liquid crystal panel between the first polarizing plate and the second polarizing plate, wherein the optical film is disposed such that light emitted from the liquid crystal panel will enter the low refractive index pattern resin layer and then be emitted through the high refractive index pattern resin layer, wherein in the second polarizing plate, the polarizer, the low refractive index pattern resin layer and the high refractive index pattern resin layer are in this order from the liquid crystal panel.

2. The liquid crystal display module according to claim 1, wherein the liquid crystal panel is a patterned vertical alignment (PVA) mode panel.

3. The liquid crystal display module according to claim 1, wherein the at least one engraved pattern comprises a lenticular lens pattern, a prism pattern having a triangular to decagonal cross-section, or a prism pattern having a triangular to decagonal cross-section and a curved surface at a top portion thereof.

4. The liquid crystal display module according to claim 1, wherein the high refractive index pattern resin layer has a ratio (P3/C) of a maximum pitch (P3) of the engraved pattern to a cycle (C) of about 0.5 or lower.

5. The liquid crystal display module according to claim 1, wherein the at least one engraved pattern comprises a plurality of engraved patterns, and the high refractive index pattern resin layer further comprises a flat portion between the plurality of engraved patterns.

6. The liquid crystal display module according to claim 1, wherein the low refractive index pattern resin layer has a refractive index of lower than about 1.50.

7. The liquid crystal display module according to claim 1, wherein the high refractive index pattern resin layer has a refractive index of about 1.50 or greater.

8. The liquid crystal display module according to claim 1, wherein the second polarizing plate further comprises a second protective layer, and the polarizer, the low refractive index pattern resin layer, the high refractive index pattern resin layer, the second protective layer and a functional layer are sequentially formed in this order.

9. The liquid crystal display module according to claim 1, wherein the second polarizing plate further comprises a second protective layer, and the polarizer, the second protective layer, the low refractive index pattern resin layer, and the high refractive index pattern resin layer are sequentially layered in this order, the low refractive index pattern resin layer contacting the second protective layer, and the high refractive index pattern resin layer being directly layered on the low refractive index pattern layer.

10. The liquid crystal display module according to claim 9, wherein the second protective layer is formed of at least one resin selected from the group consisting of polyethyleneterephthalate, triacetylcellulose, acrylic, and cyclic olefin polymer resins.

11. The liquid crystal display module according to claim 9, wherein the second protective layer is formed of at least one resin selected from the group consisting of polyethyleneterephthalate, triacetylcellulose, acrylic, and cyclic olefin polymer resins.

12. The liquid crystal display module according to claim 1, further comprising:
a composite optical sheet configured to emit light at an exit angle of about −40° to about +40°.

13. The liquid crystal display module according to claim 1, wherein at least one of the high refractive index pattern resin layer and the low refractive index pattern resin layer further comprises a light diffusing agent.

14. The liquid crystal display module according to claim 13, wherein the light diffusing agent is present in an amount of about 0.1 wt % to about 20 wt % in the high refractive index pattern resin layer, the low refractive index pattern resin layer, or the total of the high refractive index pattern resin layer and the low refractive index pattern resin layer.

15. A liquid crystal display comprising the liquid crystal display module according to claim 1.

* * * * *